United States Patent [19]
Åstrand

[11] Patent Number: 4,487,384
[45] Date of Patent: Dec. 11, 1984

[54] PARACHUTE CANOPY

[75] Inventor: Harald V. G. Åstrand, Karlsborg, Sweden

[73] Assignee: Irvin Fallskarms AB, Avesta, Sweden

[21] Appl. No.: 414,249

[22] PCT Filed: Dec. 14, 1981

[86] PCT No.: PCT/SE81/00373
§ 371 Date: Aug. 3, 1982
§ 102(e) Date: Aug. 3, 1982

[87] PCT Pub. No.: WO82/02030
PCT Pub. Date: Jun. 24, 1982

[30] Foreign Application Priority Data
Dec. 12, 1980 [SE] Sweden ................ 8008747

[51] Int. Cl.³ .................................... B64D 17/20
[52] U.S. Cl. .................................... 244/152
[58] Field of Search ............... 244/145, 152, 142, 99

[56] References Cited
U.S. PATENT DOCUMENTS

| | | | |
|---|---|---|---|
| 2,399,379 | 4/1946 | Pence | 244/152 |
| 3,758,056 | 9/1973 | Mitchell | 244/152 |
| 3,860,201 | 1/1975 | Hall | 244/152 |
| 4,175,722 | 11/1979 | Higgins | 244/152 |

FOREIGN PATENT DOCUMENTS 1046699 10/1966 United Kingdom ................ 244/152

Primary Examiner—Galen L. Barefoot
Attorney, Agent, or Firm—Dowell & Dowell

[57] ABSTRACT

A parachute canopy having at least one steering aperture created in a gore, which aperture is generally closed by air pressure urging the material from which the gore is formed into a closed relationship with the parachute canopy but which is relatively exposed to permit air flow therethrough by the operation of pull lines which are attached to the gore and may be used to urge the gore inwardly of the canopy in order to control the direction of descent.

6 Claims, 5 Drawing Figures

PARACHUTE CANOPY

BACKGROUND OF THE INVENTION

1. Field of the Invention

The present invention relates to a parachute canopy of the type which comprises at least one steering or air passage aperture which is normally retained in a closed position by air pressure within the expanded canopy and which aperture is selectively opened to permit air passage therethrough by means of operating members such as pull lines which are controlled by a parachutist.

2. History of the Prior Art

Conventional completely closed parachute canopies have no apertures therein to control the direction of descent of the parachute, however, such closed canopies have the advantages of being quickly activated or deployed as they are rapidly filled with and retain air. Such parachutes thus afford safe deployment and require little vertical drop before becoming operative. These parachutes, therefore, are usually used for rescue and paratroop purposes.

In certain situations, it would be advantageous for the user of a parachute to be able to manipulate the chute or steer it during descent. The capability of maneuvering the parachute during descent makes it possible to avoid possible mid-air collisions with other parachutists as well as to avoid obstacles on the ground. In order to make parachutes more maneuverable, some conventional parachutes have been designed so that the shape of the parachute may be changed during descent to affect a steering of the chute. In other types of parachutes, steering is accomplished by altering the effective air pressures around the parachute by placing openings in the canopy which create a steering effect forcing the chute in a particular direction. In order to control the amount of air flow through such openings, prior art parachutes are provided with means for reducing the size of the openings during descent. Such reduction in the size of the openings is usually affected by the parachutist through the use of pull lines which extend from an area adjacent the opening to the parachute harness.

A drawback encountered with the use of conventional parachutes having openings therein which are used to control steering of the parachute during descent is that often such parachutes descend at a faster rate. For inexperienced jumpers the use of parachutes having steering openings therein may present an increased safety risk as the user of the parachute may not be familiar nor comfortable with controlling the amount of air flow through such openings to affectuate the proper movement of the chute as it descends. In paratrooping operations, experience has taught that there are increased risks of collision between parachutists immediately after the jump is initiated when steerable parachutes of conventional design have been used as the chutes have a tendency to be driven against one another before control thereof is established by the paratroopers. In addition to the foregoing, there is increased risk of collision between parachutists using steerable parachutes when jumping in darkness as the parachutists have difficulty in seeing one another in time to make the appropriate adjustment to the chute to prevent a collision.

SUMMARY OF THE INVENTION

This invention is directed to a parachute canopy having openings therein to permit the passage of air to make it possible to steer the parachute during descent and wherein the openings extend generally radially with respect to the center of the canopy extending along a line between two gores. In one embodiment of the invention, a single radially extending slot provides the aperture through which air is selectively permitted to flow as the free end of one gore is pulled away from the adjacent gore. An air permeable material such as an open mesh cloth or netting is provided over the entire width of the gore which is movable to create the air passage opening and thereby serves as a retaining surface to prevent the free edge of the movable gore from extending outwardly of the parachute canopy. In another embodiment of the invention, the radially extending opening in the movable gore may be enlarged by cutting the gore at two spaced points in a direction perpendicularly with respect to the radial opening in the gore to thereby form a generally rectilinear flap which is hinged about the joint of the movable gore with the immediately adjacent gore. In both of the foregoing embodiments, control lines extend from the movable gore to the parachute harness whereby a vertical force may be exerted by the parachutist to cause the movable gore to be pulled away from the adjacent gore to increase the opening therebetween.

It is a primary object of the present invention to provide a steerable parachute canopy having an opening therein wherein the opening is normally covered during initial deployment of the canopy so that the parachute functions essentially the same as an unsteerable parachute when initially deployed.

It is another object of the present invention to provide a steerable parachute canopy which functions as a conventional canopy having no steering openings therein when initially deployed but which can be steered by selectively exposing openings therein by the actuation of the parachutist of lines which extend to movable gores which are vertically displaceable to make openings in the canopy.

These and other objects of the invention are achieved in accordance with the following description and with reference to the drawings and subsequent claims.

DESCRIPTION OF THE PREFERRED EMBODIMENT

Figure 1:
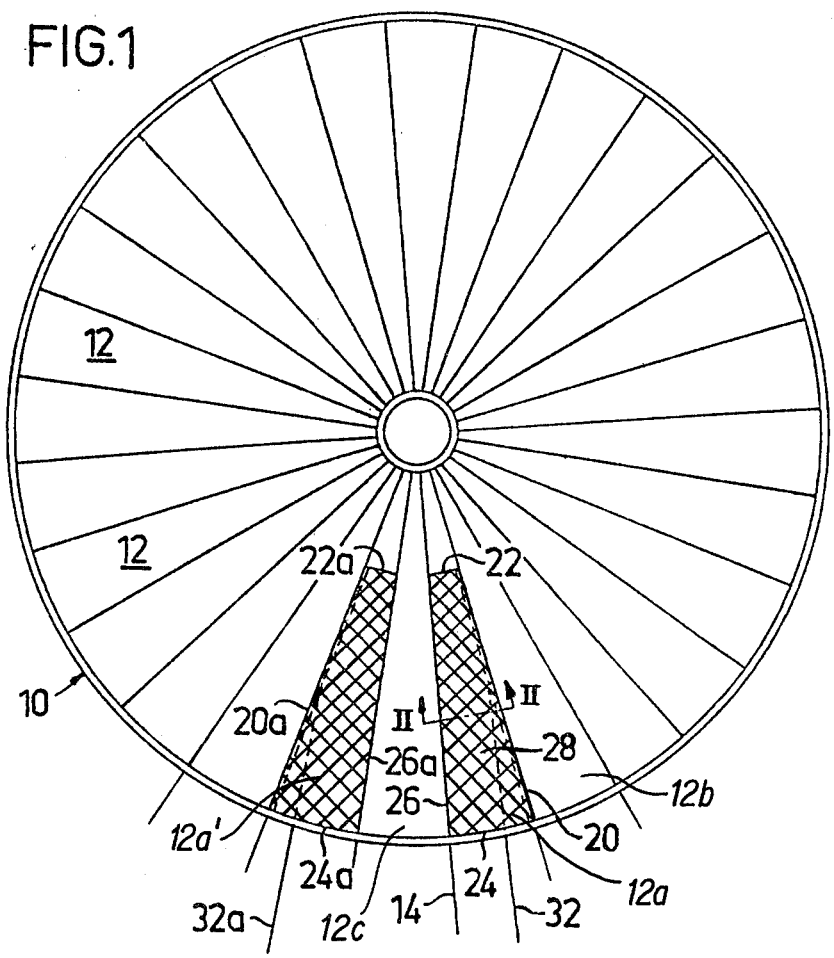
FIG. 1 is a top plan view of a parachute canopy according to the present invention showing two steering aperatures placed in spaced and symmetrical relation in the parachute canopy.
Figure 3:
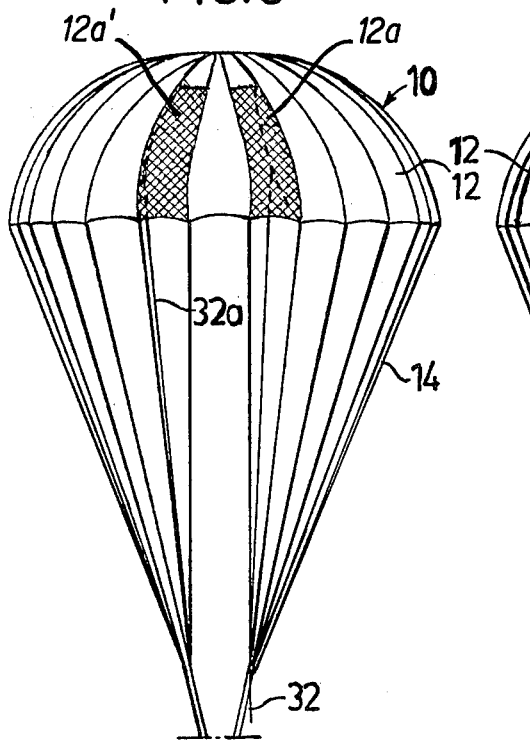
FIG. 3 is a front elevational view of the parachute canopy shown in FIG. 1 in which a single elongated slit in one of the gores is shown in dotted line.

The parachute of the present invention is shown in FIG. 1 including a round canopy 10 which is generally dome-shaped and which is constructed of a number of radially extending gores 12. As is shown in FIGS. 3 and 4, the parachute canopy 10 is connected in a conventional manner by a number of shroud lines 14 with fittings 16 which in turn are connected by straps or woven belts 18 with a harness (not shown) which is adapted to be worn by a parachutist.

The parachute canopy made according to the invention has two steering apertures which are formed identically alike, therefore, only the aperature shown at the right in FIG. 1 will be described in detail. Each steering opening is formed by a slit or slot 20 which extends radially between two gores 12a and 12b. The slot 20 may itself constitute the steering aperture or, in addition, slots or slits 22 and 24 may be made in the gore 12a which slits extends generally perpendicularly from the slot 20 along the width of the gore to the joint or seam 26 between gore 12a and gore 12c thereby forming a flap 21. In this manner an enlarged opening is created in the gore 12a which is covered by the flap 21. The flap 21 is connected with the parachute canopy along the radial joint or seam 26 between the slots 22 and 24. The gore portion of the parachute canopy which includes the slot 20 and in some instances slots 22 and 24, will be hereinafter defined as a steering gore. The steering gore 12a is covered by an air-permeable material, such as open-meshed cloth, netting or ribbon 28, which is sewn onto the external side of the canopy and thereby prevents the steering gore from opening towards the upper side of the parachute canopy 10. The covering material 28 is shown in FIG. 2 with dash-dotted lines and extends from joint or seam 26 to gore 12b.

Figure 4:
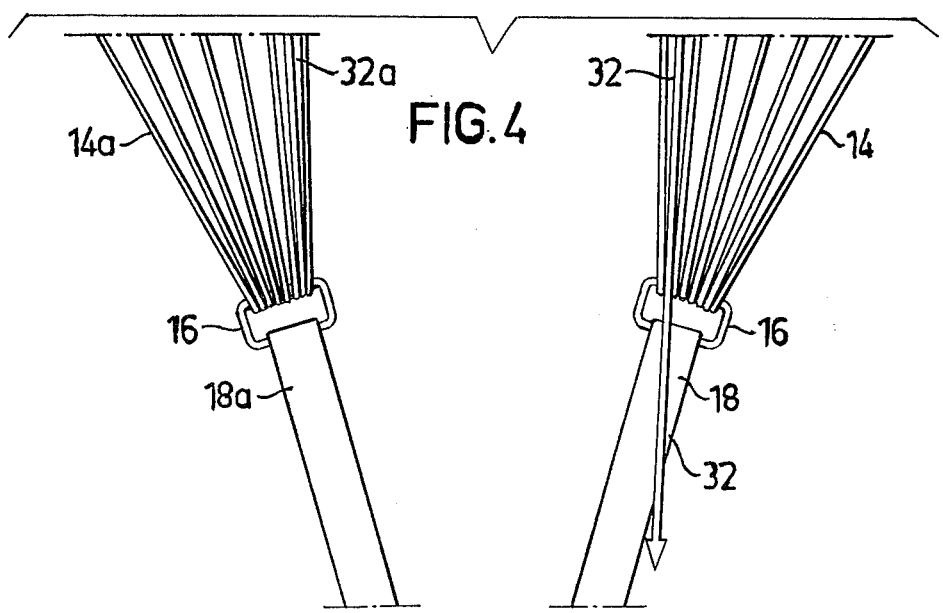
FIG. 4 is an enlarged view of the parachute harness as it is attached to the control and shroud lines of the parachute shown in FIG. 3.

Fixed to the exposed or free edge portion 30 of the steering gore 12a along the slot 20 is a pull line 32 wich extends down to the parachute fitting 16 shown in FIG. 4. The pull line 32 may be connected along the central area of the free edge portion 30. By pulling the pull line 32 in the direction indicated by the arrow in FIG. 4, the steering gore can be urged downwardly with respect to the adjacent gore 12b to a position indicated with broken lines in the FIGS. 2 and 3. Thereby the slot 20 or enlarged opening is uncovered permitting air to flow outwardly from the interior of the parachute canopy through the air-permeable material 28. The movement of the air through the slot or opening accomplishes a steering movement of the parachute.

Figure 2:
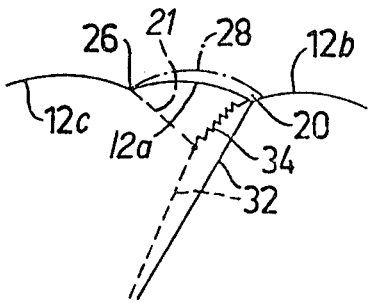
FIG. 2 is an enlarged cross-sectional view taken along lines II—II of FIG. 1.

If the parachutist releases the operating line 32, the steering gore 12a will be closed by the air pressure as shown in FIG. 2 in full lines. Thereafter, the parachute works as a conventional non-apertured parachute having a closed canopy.

The return movement of the steering gore 12a or flap 21 can be assisted by elastic straps 34 or the like attached between the edge of the adjacent parachute gore 12b and the steering gore 12a or flap 21. The straps 34 can be used also to limit the effective opening area of the aperture. Separate return and arresting straps may also be provided.

Figure 5:
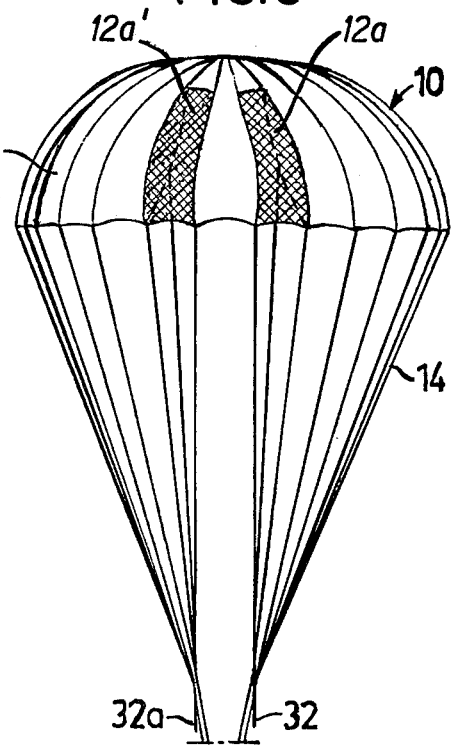
FIG. 5 is a front elevational view of the parachute canopy shown in FIG. 1 showing in dotted line both the spaced gores in an open position.

The steering gores 12a' shown in the left of FIGS. 1, 3 and 5 are identical to the steering gores 12a, but reversed. The numbers shown in the drawings have been given the same designations with an "a" added.

If the steering gores 12a and 12a', which are shown in the FIGS. 1 to 5, are positioned in the rear half of the parachute canopy 10, relatively to the direction which is faced by the jumper, and the right pull line 32 shown in FIGS. 3 and 4 is pulled downwardly, a turning movement is created to the left of the parachute. With a simultaneous downward movement of both the right and the left pull lines 32 and 32a, shown in FIG. 5, a driving movement forwardly is created. It is clear that positioning of the gores 12a and 12a' on the front half of the parachute canopy 10 results in an opposite effect. Also, the steering gores 12a and 12a' can be more in number than 2, such as 4, 6, etc., so long as such gores are uniformly placed on the opposite sides of the canopy.

As is evident from the foregoing, a parachute has been designed which, under deployment as well as in situations of panic when the jumper may accidentally release the pull or control lines go, works as a paracute with totally closed canopy, whereas, at the same time, the canopy may be steered by suitable actuations of the pull lines 32 and 32a.

Obviously, the invention is not limited to the shown and described embodiment but may be varied within the scope of the basic concept taught herein.

I claim:

1. A generally circular parachute canopy having inner and outer surfaces defined by a plurality of radially extending gores which are assembled in edge to edge relationship along radially extending joints the improvement comprising an elongated radially extending slit formed along at least a portion of one of the gores contiguous to the joint with an adjacent gore, said at least one of the gores having a free edge portion along said slit which edge portion is selectively removable with respect to said adjacent gore, an air-pervious material attached to the outer surface of the canopy and extending over the entire length of said slit, and pull means attached adjacent to said free edge of said one of the gores and extending from the inner surface of the canopy to a point remote from said slit whereby said one of said gores is normally retained in a closed position with respect to said adjacent gore closing said slit therebetween as a parachute is in use but being selectively openable by exerting a downward force on said pull means thereby separating said free edge of said one of the gores from said adjacent gore thereby forming an air opening therethrough.

2. The parachute canopy of claim 1 in which said pull means is attached along the middle portion of said free edge of said one of said gores.

3. The parachute canopy of claim 1 including elastically yielding means connecting said free edge of said one of the gores to said adjacent gore.

4. The parachute canopy of claim 1 including an additional elongaged radially extending slit formed in another one of said gores, said another of said gores being in spaced relationship on an opposite side of said canopy whereby said slits are symmetrically positioned and spaced with respect to said canopy.

5. The parachute canopy of claim 4 including a plurality of pairs of slits formed in said parachute canopy, each of said pairs of slits being disposed on opposite halves and symmetrically oriented with respect to said canopy, each of said slits being defined by an edge portion of one of the gores, and pull means attached adjacent each of said edge portions of said gores and extending therefrom to a point remote from the inner surface of said canopy.

6. The parachute canopy of claim 1 in which said slit has first and second ends, a pair of spaced secondary slots extending generally perpendicularly with respect to said ends of said slit, each of said secondary slots extending from the joint with said adjacent gore and across said one of the gores to the next adjacent radially extending joint of said canopy whereby an enlarged opening is selectively provided through said one of said gores.

* * * * *